United States Patent
Beers et al.

(10) Patent No.: US 9,611,784 B2
(45) Date of Patent: Apr. 4, 2017

(54) INSULATING SEAL PLATE FOR AN AIR CYCLE MACHINE

(71) Applicant: Hamilton Sundstrand Corporation, Windsor Locks, CT (US)

(72) Inventors: Craig M. Beers, Wethersfield, CT (US); Christopher McAuliffe, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 641 days.

(21) Appl. No.: 14/049,790

(22) Filed: Oct. 9, 2013

(65) Prior Publication Data
US 2015/0098805 A1    Apr. 9, 2015

(51) Int. Cl.
| | |
|---|---|
| *F01D 11/02* | (2006.01) |
| *F02C 1/04* | (2006.01) |
| *B64D 13/00* | (2006.01) |
| *F02C 7/32* | (2006.01) |

(52) U.S. Cl.
CPC .............. *F02C 1/04* (2013.01); *B64D 13/00* (2013.01); *F01D 11/02* (2013.01); *F02C 7/32* (2013.01); *Y02T 50/672* (2013.01)

(58) Field of Classification Search
CPC ...... F01D 11/003; F04D 29/102; F04D 29/16; F04D 29/162
USPC ............................................ 415/171.1, 174.5
See application file for complete search history.

(56) References Cited

U.S. PATENT DOCUMENTS

| | | | | |
|---|---|---|---|---|
| 5,224,842 A | * | 7/1993 | Dziorny | F04D 29/102 |
| | | | | 417/406 |
| 2012/0156008 A1 | * | 6/2012 | Chrabascz | F16J 15/44 |
| | | | | 415/170.1 |
| 2012/0156011 A1 | * | 6/2012 | Richardson | F16J 15/44 |
| | | | | 415/174.2 |
| 2012/0328418 A1 | | 12/2012 | Yang et al. | |
| 2013/0094938 A1 | | 4/2013 | Gee et al. | |

* cited by examiner

*Primary Examiner* — Gregory Anderson
*Assistant Examiner* — Michael Sehn
(74) *Attorney, Agent, or Firm* — Kinney & Lange, P.A.

(57) ABSTRACT

A seal assembly of an air cycle machine includes a seal plate with an outer diameter. A bore extends axially through a center of the seal plate and a seal land is disposed at least partially within the bore. The seal land includes an inner diameter and a minimum ratio between the inner diameter of the seal land and the outer diameter of the seal plate is approximately 0.1985.

14 Claims, 2 Drawing Sheets

INSULATING SEAL PLATE FOR AN AIR CYCLE MACHINE

BACKGROUND

The present invention relates to Air Cycle Machines (ACMs) and more specifically to seal plates for ACMs.

ACMs generally include a compressor section to compress air. The compressed air is discharged to a downstream heat exchanger and further routed to a turbine. The turbine extracts energy from the expanded air to drive the compressor. The air output from the turbine is generally utilized as an air supply for a vehicle, such as the cabin of an aircraft. ACMs can be used to achieve a desired pressure, temperature, and humidity in the air that is transferred to the environmental control system of the aircraft.

ACMs often have a three-wheel or four-wheel configuration. In a three-wheel ACM, a turbine drives both a compressor and a fan which rotate on a common shaft. In a four-wheel ACM, two turbine sections drive a compressor and a fan on a common shaft. In any configuration, airflow can be directed into the fan section and the compressor section. The airflow is then directed away from the compressor section towards the heat exchanger, from the heat exchanger to the turbine or turbines, and from the final turbine stage out of the ACM. ACMs can include seal plates that are disposed between the compressor section and the turbine section to reduce heat transfer between the compressor section and the turbine section. Seal plates can negatively reduce the power performance of ACMs as they can create drag on the rotating parts of ACMs.

SUMMARY

In one aspect, a seal assembly of an air cycle machine includes a seal plate with an outer diameter. A bore extends axially through a center of the seal plate and a seal land is disposed at least partially within the bore. The seal land includes an inner diameter and a minimum ratio between the inner diameter of the seal land and the outer diameter of the seal plate is approximately 0.1985.

In another aspect, an air cycle machine includes a shaft and a compressor section positioned around the shaft, the compressor section being capable of compressing a working fluid. A turbine section is arranged adjacent to the compressor section and is positioned around the shaft. The turbine section is capable of converting potential energy of the working fluid to rotational energy. A seal assembly is disposed between the compressor section and the turbine section and around the shaft. The seal assembly includes a seal plate having an outer diameter. A bore extends axially through a center of the seal plate and is positioned around the shaft. An annular seal land is disposed at least partially within the bore and around the shaft. A first connecting element connects the seal assembly against the compressor section. A ratio between the outer diameter of the seal plate and an axial thickness of the seal plate proximate the first connecting element is approximately 23.7107 to 24.1317.

Persons of ordinary skill in the art will recognize that other aspects and embodiments of the present invention are possible in view of the entirety of the present disclosure, including the accompanying figures.

Figure 1:
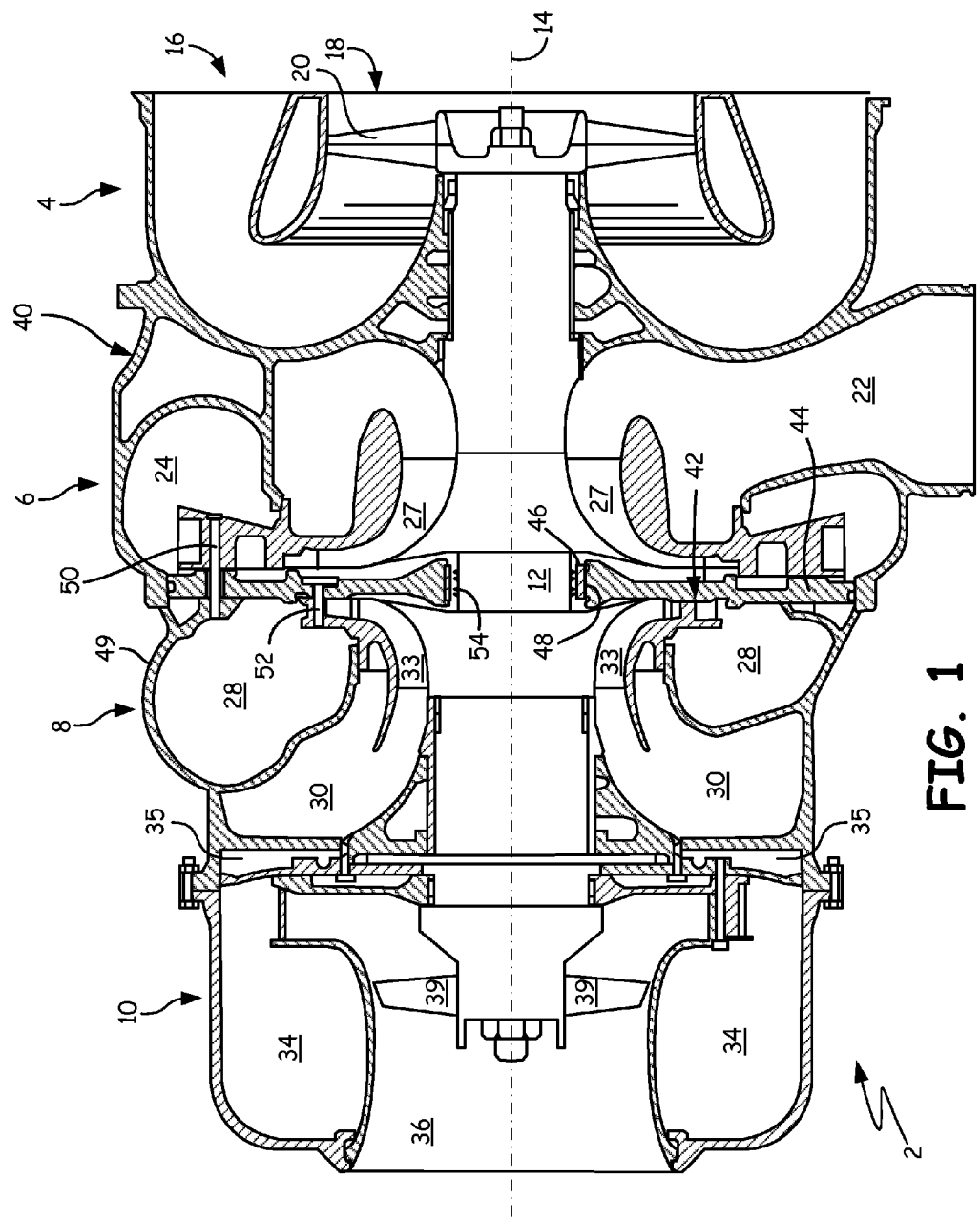
FIG. 1 is a cross-sectional view of an embodiment of an air cycle machine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The invention relates to a seal plate and seal land mounted on the seal plate in an air cycle machine (ACM). The dimensions and dimensional ratios of the seal plate and the seal land are selected in order to achieve a reduction in frictional losses (seal drag) between the seal land and seal teeth disposed on a rotating shaft that transfers turbine power to the compressor and fan. Minimizing the frictional losses of seal drag is also balanced against minimizing the clearance between the seal plate and the seal teeth to minimize compressor inlet flow loss across the seal land and seal teeth.

FIG. 1 is a cross-sectional view of ACM 2. ACM 2 is a four-wheel ACM, containing fan section 4, compressor section 6, first turbine section 8, and second turbine section 10, which are all connected to shaft 12 for common rotation about central axis 14. It should be noted that ACM 2 is shown and described merely by way of example and not limitation. Numerous other ACM configurations are possible in further embodiments, such as for three-wheel ACMs.

When working fluid passes through ACM 2, it is first compressed in compressor section 6, and then expanded in first turbine section 8 and second turbine section 10. Often, a first working fluid is heated or cooled in a heat exchanger (not shown) through which working fluid is routed as it passes between compressor section 6 and first turbine section 8. First turbine section 8 and second turbine section 10 extract energy from the working fluid, turning shaft 12 about central axis 14. Meanwhile, a second working fluid is routed through the same heat exchanger by fan section 4. For example, the first working fluid can be routed from a bleed valve of a gas turbine engine through compressor section 6, to a heat exchanger, to first turbine section 8, then to second turbine section 10, and then to the environmental control system of an aircraft. The second working fluid can be ram air that is pulled by fan section 4 through the same heat exchanger to cool the first working fluid to a desired temperature before routing of the first working fluid to the turbine sections 8 and 10. By compressing, heating, and expanding the working fluid, the output provided at the second turbine 10 can be adjusted to a desired temperature, pressure, and/or relative humidity.

Fan section 4 includes fan inlet 16 and fan outlet 18. Fan inlet 16 is an opening in ACM 2 that receives working fluid from another source, such as a ram air scoop. Fan outlet 18 allows working fluid to escape fan section 4. Fan blades 20 can be used to draw working fluid into fan section 4.

Compressor section 6 includes compressor inlet 22, compressor outlet 24, and compressor blades 27. Compressor inlet 22 is a duct defining an aperture through which working fluid to be compressed is received from another source. Compressor inlet 22 directs working fluid from compressor inlet 22 to compressor blades 27 where the working fluid is compressed before entering compressor outlet 24. Compressor outlet 24 allows working fluid to be routed to other systems after it has been compressed.

First turbine section 8 includes first stage turbine inlet 28, first stage turbine outlet 30, and first turbine blades 33. First stage turbine inlet 28 is a duct defining an aperture through which working fluid passes prior to expansion in first turbine section 8. First stage turbine outlet 30 is a duct defining an aperture through which working fluid (which has expanded) departs first turbine section 8. First stage turbine blades 33 are disposed in the flow path between first stage turbine inlet 28 and outlet 30 and extract energy from working fluid passing therethrough, driving the rotation of first turbine section 8 and attached components, including shaft 12, fan section 4, and compressor section 6.

Second turbine section 10 includes second stage turbine inlet 34, second stage turbine outlet 36, and second stage turbine blades 39. Second stage turbine inlet 34 is a duct defining an aperture through which working fluid passes prior to expansion in second turbine section 10. Second stage turbine outlet 36 is a duct defining an aperture through which working fluid (which has expanded) departs second turbine section 10. Second stage turbine blades 39 are disposed in the flow path between second stage turbine inlet 34 and second stage turbine outlet 36 and extract energy from working fluid passing therethrough, driving the rotation of second turbine section 10 and attached components, including shaft 12, fan section 4, and compressor section 6. Working fluid passes from second stage turbine inlet 34 to cavity 35, where it is incident upon second stage turbine blades 39. Working fluid can then pass across vanes or nozzles that help guide and straighten the flow for optimum efficiency. The flow of working fluid causes turbine blades 39 to rotate and turn shaft 12.

Shaft 12 can be a rod, such as a titanium tie-rod, used to connect other components of ACM 2. Central axis 14 is an axis with respect to which other components can be arranged. Fan section 4 is connected to compressor section 6. In some embodiments, fan outlet 18 can be coupled to compressor inlet 22. Working fluid is drawn through fan inlet 16 and discharged through fan outlet 18 by fan blades 20. Working fluid from fan outlet 18 can be routed to compressor inlet 22 for compression in compressor section 6. Similarly, compressor section 6 is coupled with first turbine section 8. Working fluid from compressor outlet 24 is routed to first stage turbine inlet 28.

Fan section 4 and compressor section 6 share housing 40. Housing 40 encloses the moving parts and air paths through fan section 4 and compressor section 6. The size and geometry of housing 40 define the flow of air through ACM 2. For example, housing 40 is arranged about shaft 12 so as to prevent excessive airflow around shaft 12. Housing 40 is sized to coordinate with adjacent housing sections, such as the housing surrounding turbine section 8.

Seal assembly 42 is disposed between compressor section 6 and first turbine section 8 and around shaft 12. Seal assembly 42 is configured to mate with turbine housing 49 and cooperate with turbine housing 49 to prevent fluid egress from compressor inlet 22. Seal assembly 42 is also configured to function as a thermal barrier to reduce heat transfer between compressor section 6 and first turbine section 8. Seal assembly 42 includes seal plate 42 and annular seal land 46. Bore 48 extends axially through a center of seal plate 44 and is positioned around shaft 12. First connecting element 50 extends axially from compressor section 6 and seal plate 44 to connect seal assembly 42 against compressor section 6. As shown in FIG. 1, first connecting element 50 can be a bolt. Second connecting element 52 extends axially across seal plate 44 and into first turbine section 8 to connect seal assembly 42 against first turbine section 8. Second connecting element 52 can also be a bolt. Second connecting element 52 can be disposed radially inward from first connecting element 52.

Seal land 46 is annular and is disposed around shaft 12 and at least partially within bore 48. Seal land 46 can consist essentially of a polymer material or other suitable material (e.g., low friction and/or wear resistant materials) while seal plate 44 can be formed from a thermally insulating composite material. Knife edges 54 are annular and disposed around shaft 12 and radially inward from the seal land 46. Knife edges 54 rotate with shaft 12 during operation of ACM 2. Knife edges 54 extend from shaft 12 radially towards seal land 46 and engage seal land 46. Together, seal land 46 and knife edges 54 form a labyrinth seal between seal plate 44 and shaft 12 that assists in reducing hot air from leaking into first turbine section 8 from compressor section 6 and heating the cooler conditioned air in first turbine section 8. As discussed below with respect to FIG. 2, seal plate 44 and seal land 46 can be sized such that the clearance between knife edges 54 and land 46 is sufficiently minimized to reduce leakage between seal land 46 and knife edges 54 yet such that there is sufficient clearance between knife edges 54 and seal land 46 to prevent frictional losses and seal drag from occurring.

Figure 2:
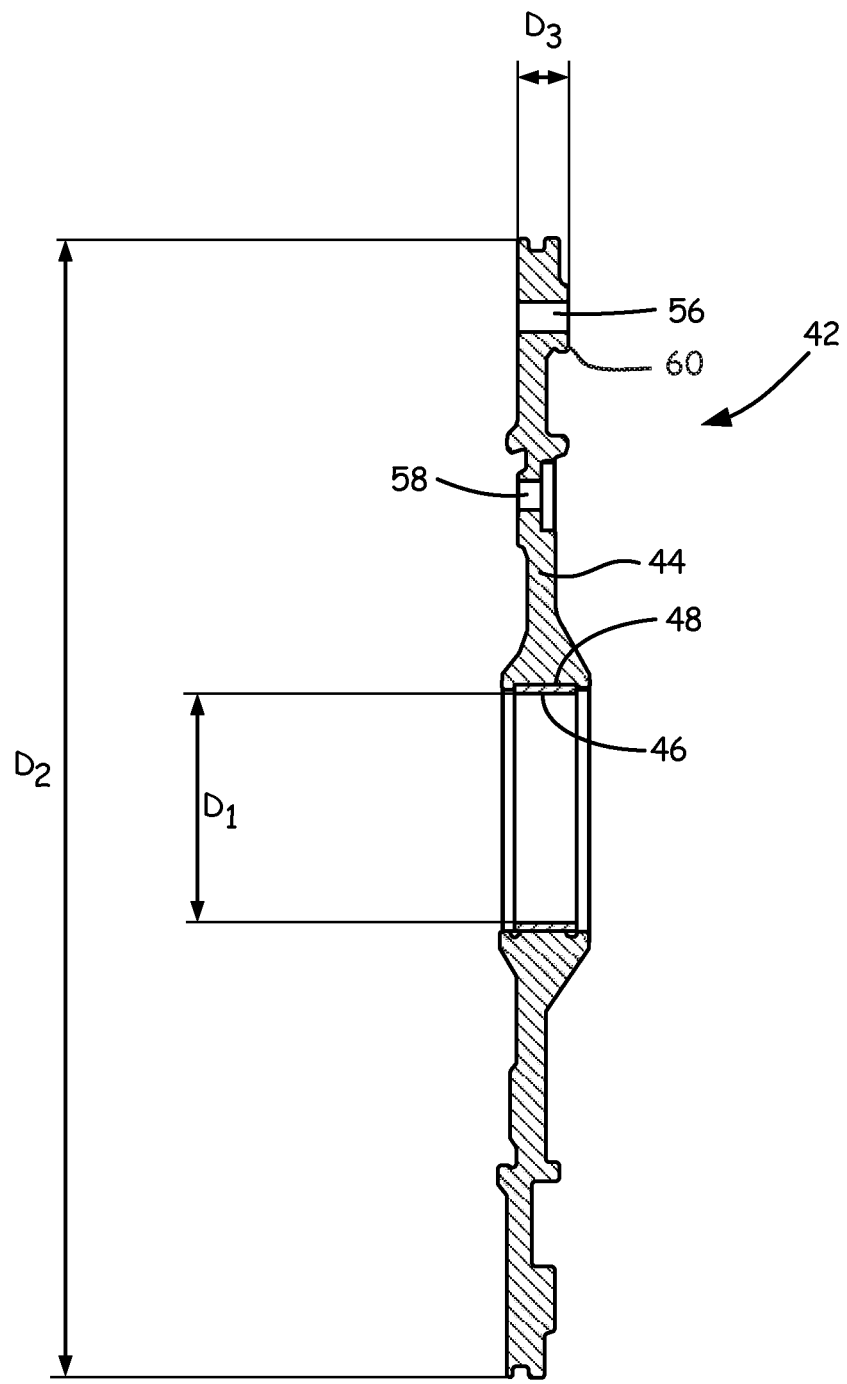
FIG. 2 is a cross-sectional view of a seal assembly from the air cycle machine of FIG. 1.

FIG. 2 is a cross-sectional view of seal assembly 42 from ACM 2 of FIG. 1. As shown in FIG. 2, seal land 46 of seal assembly 42 includes inner diameter D1. Along with the elements describe above with respect to FIG. 1, seal plate 44 of seal assembly 42 can further include first hole 56, second hole 58, boss 60, outer diameter D2, and thickness D3.

In one embodiment, seal assembly 42 can be configured as follows. Inner diameter D1 of seal land 46 is defined as the diameter of the radial inner surface of seal land 46. Inner diameter D1 of seal land 46 can be approximately 4.343654 cm (1.7101 inches) to 4.348734 cm (1.7121 inches). Outer diameter D2 of seal plate 44 is defined as the radial outer diameter of seal plate 44. Outer diameter D2 of seal plate 44 can be approximately 21.86178 cm (8.607 inches) to 21.8821 cm (8.615 inches). A ratio (D1/D2) between inner diameter D1 of seal land 46 and outer diameter D2 of seal plate 44 can be approximately 0.1985 to 0.1989. The dimensions of inner diameter D1 and outer diameter D2 can be scaled up or scaled down to accommodate use of seal assembly 42 in air cycle machines of varying size. The ratio between inner diameter D1 and outer diameter D2 defines a scalable geometry of seal plate 44 and seal land 46 that effectively reduces leakage from compressor section 6 across seal assembly 42 and into first turbine section 8, while at the same time minimizing frictional losses and seal drag from occurring between seal assembly 42 and shaft 12. The portion of housing 40 disposed around outer diameter D2 of seal plate 44 can include an inner diameter approximately equal to outer diameter D2 of seal plate 44, as shown above in FIG. 1.

First hole 56 extends axially through seal plate 44 and is radially disposed between an outer diameter surface of seal plate 44 and bore 48. First hole 56 is configured to accommodate first connecting element 50 for connecting seal assembly 42 to compressor section 6 of ACM 2 as shown in FIG. 1. Second hole 58 extends axially through seal plate 44 and is radially positioned on seal plate 44 between first hole 56 and bore 48. Second hole 58 is configured to accommodate second connecting element 52 for connecting seal assembly 42 to first turbine section 8 of ACM 2 as shown in FIG. 1. Boss 60 can be formed around first hole 56 and locally increases the axial thickness of seal plate 44 proximate first hole 56, as represented by thickness D3. Boss 60 functions as a primary contact point between seal assembly 42 and compressor section 6 and therefore also is the primary heat transfer path between compressor section 6 and seal assembly 42. Thickness D3 of seal plate 44 proximate boss 60 and first hole 56 is generally greater than the axial thickness of the rest of seal plate 44 so as to help resist and minimize the conductive heat transfer across seal assembly 42 at boss 60. Thickness D3 of seal plate 44 proximate first hole 56 can be approximately 0.90678 cm (0.357 inches) to 0.92202 cm (0.363 inches). Thickness D3 can be rationally related to inner diameter D1 of seal land 46 to ensure that thickness D3 is sufficiently thick to provide the insulating demands of seal plate 44 as seal assembly 42 is scaled up in size or scaled down in size. For example, a ratio (D1/D3) between inner diameter D1 of seal land 46 and thickness D3 of seal plate 44 proximate can be approximately 4.7110 to 4.7958. Similarly, thickness D3 can be rationally related to outer diameter D2 of seal plate 44. For example, a ratio (D2/D3) between outer diameter D2 of seal plate 44 and thickness D3 of seal plate 44 can be approximately 23.7107 to 24.1317.

Possible Benefits:

Persons of ordinary skill in the art will recognize that seal assembly 42 of the present invention can provide numerous advantages and benefits. Some examples of those advantages and benefits are as follows. Seal assembly 42 provides seal plate 44 and seal land 46 that thermally insulate first turbine section 8 against the thermally hot gases that can be present in compressor section 6 in ACM 2. Furthermore, the dimensions of seal plate 44 and seal land 46 are configured to reduce flow gas leakage from compressor section 6 entering first turbine section 8 along shaft 12. Along with reducing flow gas leakage, the dimensions of seal plate 44 and seal land 46 are configured to minimize frictional losses and drag between seal assembly 42 and shaft 12. Seal assembly is also easy to scale up in size or scale down in size as outer diameter D2 of seal plate 44 and inner diameter D1 of seal land 46 are rationally related. Seal plate 44 also includes thickness D3 that locally increases the axial thickness of seal plate 44 proximate to where seal plate 44 connects to compressor section 6. Thickness D3 improves the insulating properties of seal plate 44 by increasing the thickness and thermal resistance of seal plate 44 at the portion of seal plate 44 that experiences the most heat transfer from compressor section 6. Thickness D3 is also rationally related to inner diameter D1 of seal land 46 and outer diameter D2 of seal plate 44, allowing for thickness D3 to be easily scaled up or down in size.

Discussion of Possible Embodiments

The following are non-exclusive descriptions of possible embodiments of the present invention.

In one embodiment of the present invention, a seal assembly of an air cycle machine can include a seal plate with an outer diameter. A bore extends axially through a center of the seal plate and a seal land is disposed at least partially within the bore. The seal land includes an inner diameter and a minimum ratio between the inner diameter of the seal land and the outer diameter of the seal plate is approximately 0.1985.

The assembly of the preceding paragraph can optionally include, additionally and/or alternatively, any one or more of the following features, configurations and/or additional components:

a maximum ratio between the inner diameter of the seal land and the outer diameter of the seal plate is approximately 0.1989;

a hole for connecting the seal assembly to a compressor section of the air cycle machine extends axially through the seal plate and is radially disposed between the outer diameter of the seal plate and the bore;

a boss is formed around the hole and locally increases a thickness of the seal plate proximate the hole;

a ratio between the inner diameter of the seal land and a thickness of the seal plate proximate the hole is approximately 4.7110 to 4.7958;

a ratio between the outer diameter of the seal plate and a thickness of the seal plate proximate the hole is approximately 23.7107 to 24.1317;

a thickness of the seal plate proximate the hole is approximately 0.90678 cm (0.357 inches) to 0.92202 cm (0.363 inches);

the outer diameter of the seal plate is approximately 21.86178 cm (8.607 inches) to 21.8821 cm (8.615 inches); and/or the inner diameter of the seal land is approximately 4.343654 cm (1.7101 inches) to 4.348734 cm (1.7121 inches).

In another embodiment of the present invention, an air cycle machine can include a shaft and a compressor section positioned around the shaft, the compressor section being capable of compressing a working fluid. A turbine section is arranged adjacent to the compressor section and is positioned around the shaft. The turbine section is capable of converting potential energy of the working fluid to rotational energy. A seal assembly is disposed between the compressor section and the turbine section and around the shaft. The seal assembly includes a seal plate having an outer diameter. A bore extends axially through a center of the seal plate and is positioned around the shaft. An annular seal land is disposed at least partially within the bore and around the shaft. A first connecting element connects the seal assembly against the compressor section. A ratio between the outer diameter of the seal plate and an axial thickness of the seal plate proximate the first connecting element is approximately 23.7107 to 24.1317.

The air cycle machine of the preceding paragraph can optionally include, additionally and/or alternatively, any one or more of the following steps, features, and/or configurations:

the seal land has an inner diameter and a minimum ratio between the inner diameter of the seal land and the outer diameter of the seal plate is approximately 0.1985;

a second connecting element connects the seal assembly against the turbine section, and the second connecting element is disposed radially inward from the first connecting element;

a housing disposed around the outer diameter of the seal plate of the seal assembly, the housing having an inner diameter approximately equal to the outer diameter of the seal plate;

the annular seal land consists essentially of a polymer material; and/or a knife edge disposed around the shaft and radially inward from the annular seal land of the seal assembly, the knife edge extending radially toward the annular seal land.

Summation

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, while the above description describes inner diameter D1 as being approximately 4.343654 cm (1.7101 inches) to 4.348734 cm (1.7121 inches), outer diameter D2 as being approximately 21.86178 cm (8.607 inches) to 21.8821 cm (8.615 inches), and thickness D3 as being approximately 0.90678 cm (0.357 inches) to 0.92202 cm (0.363 inches), the dimensions of D1, D2, and D3 can be varied and adapted without departing from the scope of the invention. Therefore, it is intended that the invention not be limited to the particular embodiment(s) disclosed, but that the invention will include all embodiments falling within the scope of the appended claims.

The invention claimed is:

1. A seal assembly of an air cycle machine, the seal assembly comprising:
   a seal plate having an outer diameter;
   a bore extending axially through a center of the seal plate; and
   a seal land disposed at least partially within the bore, the seal land having an inner diameter,
   wherein a minimum ratio between the inner diameter of the seal land and the outer diameter of the seal plate is approximately 0.1985;
   wherein a maximum ratio between the inner diameter of the seal land and the outer diameter of the seal plate is approximately 0.1989.

2. The seal assembly of claim 1, wherein a hole for connecting the seal assembly to a compressor section of the air cycle machine extends axially through the seal plate and is radially disposed between the outer diameter of the seal plate and the bore.

3. The seal assembly of claim 2, wherein a boss is formed around the hole and locally increases a thickness of the seal plate proximate the hole.

4. The seal assembly of claim 2, wherein a ratio between the inner diameter of the seal land and a thickness of the seal plate proximate the hole is approximately 4.7110 to 4.7958.

5. The seal assembly of claim 2, wherein a ratio between the outer diameter of the seal plate and a thickness of the seal plate proximate the hole is approximately 23.7107 to 24.1317.

6. The seal assembly of claim 2, wherein a thickness of the seal plate proximate the hole is approximately 0.90678 cm (0.357 inches) to 0.92202 cm (0.363 inches).

7. The seal assembly of claim 1, wherein the outer diameter of the seal plate is approximately 21.86178 cm (8.607 inches) to 21.8821 cm (8.615 inches).

8. The seal assembly of claim 1, wherein the inner diameter of the seal land is approximately 4.343654 cm (1.7101 inches) to 4.348734 cm (1.7121 inches).

9. An air cycle machine comprising:
   a shaft;
   a compressor section positioned around the shaft, the compressor section capable of compressing a working fluid;
   a turbine section arranged adjacent to the compressor section and positioned around the shaft, the turbine section capable of converting potential energy of the working fluid to rotational energy;
   a seal assembly disposed between the compressor section and the turbine section and around the shaft, the seal assembly comprising:
     a seal plate having an outer diameter;
     a bore extending axially through a center of the seal plate and positioned around the shaft; and
     an annular seal land disposed at least partially within the bore and around the shaft; and
   a first connecting element connecting the seal assembly against the compressor section,
   wherein a ratio between the outer diameter of the seal plate and an axial thickness of the seal plate proximate the first connecting element is approximately 23.7107 to 24.1317.

10. The air cycle machine of claim 9, wherein the seal land has an inner diameter and a minimum ratio between the inner diameter of the seal land and the outer diameter of the seal plate is approximately 0.1985, and wherein a maximum ratio between the inner diameter of the seal land and the outer diameter of the seal plate is approximately 0.1989.

11. The air cycle machine of claim 9 further comprising:
    a second connecting element connecting the seal assembly against the turbine section; and
    wherein the second connecting element is disposed radially inward from the first connecting element.

12. The air cycle machine of claim 9 further comprising:
    a housing disposed around the outer diameter of the seal plate of the seal assembly, and wherein the housing has an inner diameter approximately equal to the outer diameter of the seal plate.

13. The air cycle machine of claim 9, wherein the annular seal land consists essentially of a polymer material.

14. The air cycle machine of claim 9 further comprising:
    a knife edge disposed around the shaft and radially inward from the annular seal land of the seal assembly, the knife edge extending radially toward the annular seal land.

* * * * *